US010326521B2

(12) United States Patent
Reynolds et al.

(10) Patent No.: US 10,326,521 B2
(45) Date of Patent: Jun. 18, 2019

(54) SWITCHING COMMUNICATION NETWORKS ABOARD A MOVING VESSEL BASED ON CONTROL OF PRIORITY (71) Applicant: Global Eagle Entertainment, Inc., Los Angeles, CA (US)

(72) Inventors: Evan Reynolds, Seattle, WA (US); Nicholas Williams, Miramar, FL (US); Angel Jose Marcial, Sunrise, FL (US)

(73) Assignee: Global Eagle Entertainment Inc.., Los Angeles, CA (US)

( * ) Notice: Subject to any disclaimer, the term of this patent is extended or adjusted under 35 U.S.C. 154(b) by 3 days.

(21) Appl. No.: 15/686,602

(22) Filed: Aug. 25, 2017

(65) Prior Publication Data
US 2018/0062734 A1 Mar. 1, 2018

Related U.S. Application Data (60) Provisional application No. 62/379,619, filed on Aug. 25, 2016.

(51) Int. Cl.
*H04B 7/185* (2006.01)
*H04W 48/18* (2009.01)
*H04W 40/02* (2009.01)
*H04W 24/02* (2009.01)
*H04W 40/12* (2009.01)
(Continued)

(52) U.S. Cl.
CPC ..... *H04B 7/18519* (2013.01); *H04B 7/18517* (2013.01); *H04B 7/18563* (2013.01); *H04W 24/02* (2013.01); *H04W 40/12* (2013.01); *H04W 4/40* (2018.02); *H04W 48/18* (2013.01); *H04W 84/005* (2013.01)

(58) Field of Classification Search
CPC ..... H04W 48/18; H04W 84/12; H04W 88/06; H04W 84/005; H04W 4/046; H04W 24/02; H04W 88/08; H04W 36/14; H04W 40/12; H04W 88/10; H04W 72/0453; H04W 40/02; H04W 72/048; H04B 7/18517; H04B 7/18519
USPC .... 455/426.1, 552.1, 414.1, 424, 432.1, 445
See application file for complete search history.

(56) References Cited

U.S. PATENT DOCUMENTS

2015/0355334 A1* 12/2015 Stubbs ............... G01S 19/02
                                                     342/357.395
2016/0197781 A1* 7/2016 Smith ................ H04L 41/0806
                                                     370/254

* cited by examiner

*Primary Examiner* — Philip Sobutka
(74) *Attorney, Agent, or Firm* — SoCal IP Law Group LLP; Johnathan Pearce; Steven Sereboff (57) ABSTRACT A method for switching networks aboard a moving vessel includes determining that a first network-connection device located aboard the moving vessel is communicatively coupled to a first network located off the moving vessel; determining that a second network-connection device aboard the moving vessel is able to communicatively couple to a second network, the second network selected from available networks located off the moving vessel; and connecting the second network-connection device to the second network.

The method may further comprise connecting the first network-connection device to the second network; reducing the first communication activity and increasing the second communication activity; receiving an available network control from the network geographic data memory structure, the available network control comprising a list of the one or more available networks; and disconnecting the second network-connection device from the second network in response to the connection value being less than the connection threshold value.

21 Claims, 4 Drawing Sheets

(51) Int. Cl.
*H04W 84/00* (2009.01)
*H04W 4/40* (2018.01)

SWITCHING COMMUNICATION NETWORKS ABOARD A MOVING VESSEL BASED ON CONTROL OF PRIORITY

CROSS-REFERENCE TO RELATED APPLICATIONS

This application claims benefit under 35 U.S.C. 119 to U.S. application Ser. No. 62/379,619, entitled "INTELLIGENT ROUTER", filed on Aug. 25, 2016, and incorporated herein by reference in its entirety.

BACKGROUND

Ship satellite targeting systems may include at least two satellite dish antenna. Nonetheless, ship satellite dish targeting systems generally target both satellite dishes to the same satellite. In usual operation, both satellite dishes are connected to a transponder on the targeted satellite. Even if one dish is disconnected and cannot make the connection, that dish remains pointed at the associated satellite. Thus, most targeting systems can only ever target one satellite at a time. During a re-target, both dishes are moved to target another satellite. During this transition, access to the network from the ship may go offline for five to ten minutes while the dishes move, find the new satellite, and renegotiate the connection. The dishes move in lockstep with each other as otherwise routing is not possible.

In some ship satellite targeting systems, satellite dishes can target independently, but they are not coordinated. For example, if the ship is nearing the edge of a satellite connection area, the satellite dishes are not coordinated to efficiently switch networks to minimize cost and network disruptions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

It would be desirable for a targeting system to enable multiple satellite dishes to target independent satellites in a coordinated fashion. A viable system reduces the amount of time disconnected from a network and reduces costs associated with maintaining connections to various networks.

In one aspect, networks aboard a moving vessel are switched by determining that a first network-connection device located aboard the moving vessel is communicatively coupled to a first network located off the moving vessel. A second network-connection device aboard the moving vessel is determined to have the capability to communicatively couple to a second network selected from one or more available networks located off the moving vessel, and the second network-connection device is connected to the second network.

The first network-connection device may be connected to the second network, along with reducing the first communication activity and increasing the second communication activity. As used herein, "communication activity" means a level of utilization of the associated network, such as a measure of overall bandwidth usage. An available network control may be received from a network geographic data memory structure, the available network control including a list of the one or more available networks; and disconnecting the second network-connection device from the second network in response to the connection value being less than the connection threshold value.

If two satellite dishes are available and connected to a satellite, a ship-board router may be utilized to direct communication traffic away from a first satellite dish. Even while only the second dish is connected, the ship may maintains its network access reliant upon the second connected satellite dish. The first satellite dish may then search for a new connection and negotiate the connection. Once the new connection is made by the first satellite dish, communication traffic from the second dish may be transitioned, in whole or in part, to the first dish with the new connection. In other embodiments, the communication traffic on the second dish may be cut and the first dish may take over all communication traffic.

The ship-board router may be utilized to navigate blockage zones, that is, areas within the footprint of a communication satellite in which communication is blocked, such as by a geographic feature or inclement weather. Previously, when an antenna becomes blocked, traffic may have been moved to a different antenna and the blocked antenna may have remained offline. As discussed more fully below, if one antenna becomes blocked and traffic moves to the other antenna, the blocked antenna may be re-targeted. The new connection may or may not be used for communication traffic. However, if the other antenna is or may soon become blocked, communication traffic may be switched to the newly established connection by an onboard router. In some embodiments, blockage zones may be predicted and new connections made in advance to help ensure continuous communications or communications that are as continuous as possible.

Communications traffic may be moved to one antenna while the other antenna re-positions to improve the total communications signal strength or available bandwidth. Once the other antenna has an improved signal strength, communication traffic may be transferred to the newly-established connection. Thus, communications traffic may be optimized without affecting service. Communication traffic may also be optimized by other parameters including, but not limited to, projected route of the ship, weather forecast, geographic features that may result in blocking, expected volume of communications traffic, outages zones, orientation of the ship, cost of the connection, traffic on a satellite, and usage of a satellite by fleet of ships.

A method for switching networks aboard a moving vessel may include determining that a first network-connection device located aboard the moving vessel is communicatively coupled to a first network located off the moving vessel; determining that a second network-connection device aboard the moving vessel is able to communicatively couple to a second network, the second network selected from one or more available networks located off the moving vessel; and/or connecting the second network-connection device to the second network.

The method may include disconnecting the second network-connection device from the first network prior to connecting the second network-connection device to the second network. Also, the method may include disconnecting the first network-connection device from the first network in response to connecting the second network-connection device to the second network and/or connecting the first network-connection device to the second network.

The first network-connection device may have a first communication activity with the first network and the second network-connection device has a second communication activity with the second network may further include reducing the first communication activity in response to connecting the second network-connection device to the second network, increasing the second communication activity, and/or disconnecting the first network-connection device from the first network in response to the first communication activity. The first communication activity may be disconnected in response to being below a threshold level of communication activity (e.g. a bandwidth utilization or signal strength metric).

Determining that the second network-connection device is able to communicatively couple to the one or more available networks may include sending a request control to a network geographic data memory structure and/or receiving an available network control from the network geographic data memory structure. The available network control may include a list of the one or more available networks. This list or other data structure may be populated based upon historical data, activity from other satellite connections, or be manually input.

The method may include determining a connection value between the second network-connection device and the second network, receiving a connection threshold value control, which may include a connection threshold value, from a connection threshold control memory structure, and/or disconnecting the second network-connection device from the second network in response to the connection value being less than the connection threshold value.

Figure 1:
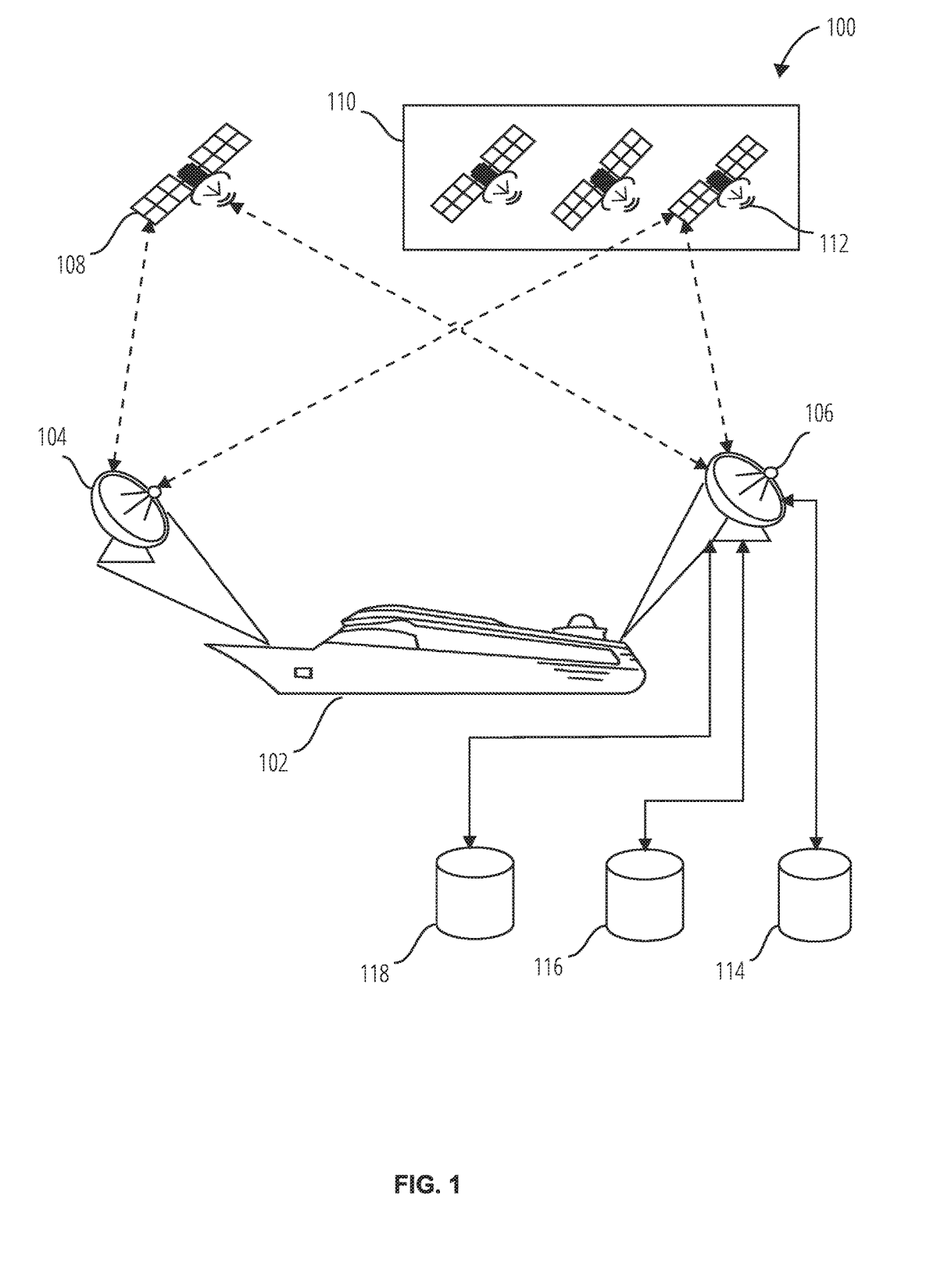
FIG. 1 illustrates an embodiment of a networks-switching system 100.

Referring to FIG. 1, the network-switching system 100 comprises a moving vessel 102, a first network-connection device 104, a second network-connection device 106, a first network 108, a one or more available networks 110, a network geographic data memory structure 114, a connection threshold control memory structure 116, and a priority control memory structure 118. The one or more available networks 110 may comprise the second network 112.

The moving vessel 102 may comprise an on-board network and systems to determine location, speed, and direction. The moving vessel 102 is coupled to the first network-connection device 104 and the second network-connection device 106 via the on-board network and may be mechanically coupled to the first network-connection device 104 and the second network-connection device 106 as well. The on-board network and systems of the moving vessel 102 may utilize the first network-connection device 104 and the second network-connection device 106 to send and receive network traffic.

The first network-connection device 104 may communicate with the first network 108 and the one or more available networks 110 including the second network 112. The first network-connection device 104 may maintain being communicatively coupled to a network until receiving a control signal to cease being communicatively coupled to that network. The first network-connection device 104 may determine the strength of the coupling with the first network 108 (e.g. a signal strength). The first network-connection device 104 may transmit the results of this strength determination to a controller or similar computing device. Thereafter, the first network-connection device 104 may receive a control signal to determine to which network to communicatively couple from the controller. Alternatively, the first network-connection device 104 may incorporate logic sufficient to enable it to choose between available networks when a strength of coupling indicator crosses predetermined thresholds such that the first network connection device 104 may transition without external control signals.

The second network-connection device 106 may communicate with the first network 108 and the one or more available networks 110 including the second network 112. The second network-connection device 106 may maintain being communicatively coupled to a network until receiving a control signal (or until internal logic instructs it) to cease being communicatively coupled to that network. The second network-connection device 106 may determine the strength of the coupling with a network. The second network-connection device 106 may receive a control signal from a controller or other computing device that indicates to which network to communicatively couple, including a geographic control from the network geographic data memory structure 114 and a priority control from the priority control memory structure 118.

The first network 108 and the one or more available networks 110 (including the second network 112) may send a receive communication signals with the first network-connection device 104 and the second network-connection device 106. The first network 108 and the one or more available networks 110 (including the second network 112) may also communicate with a control center, which may include a route generator.

The network geographic data memory structure 114 stores the communications area for each of the one or more available networks 110. The network geographic data memory structure 114 may send and receive control signals to the second network-connection device 106 to determine the one or more available networks 110.

The connection threshold control memory structure 116 stores connection threshold value controls to determine the threshold for first communication activity and second communication activity to maintain a coupling to a network. The connection threshold control memory structure 116 receives a control signal from the first network-connection device 104 or the second network-connection device 106 and, in response, sends the threshold activity to the first network-connection device 104 or the second network-connection device 106.

The priority control memory structure 118 stores priority controls for each of the one or more available networks 110. The priority control may rank each of the one or more available networks 110 based on historical network connectivity from a highest priority to a lowest priority. The priority control memory structure 118 may send and receive control signals to the second network-connection device 106 to determine the one or more available networks 110. The networks-switching system 100 may be operated in accordance with the processes described in FIG. 3.

Figure 2:
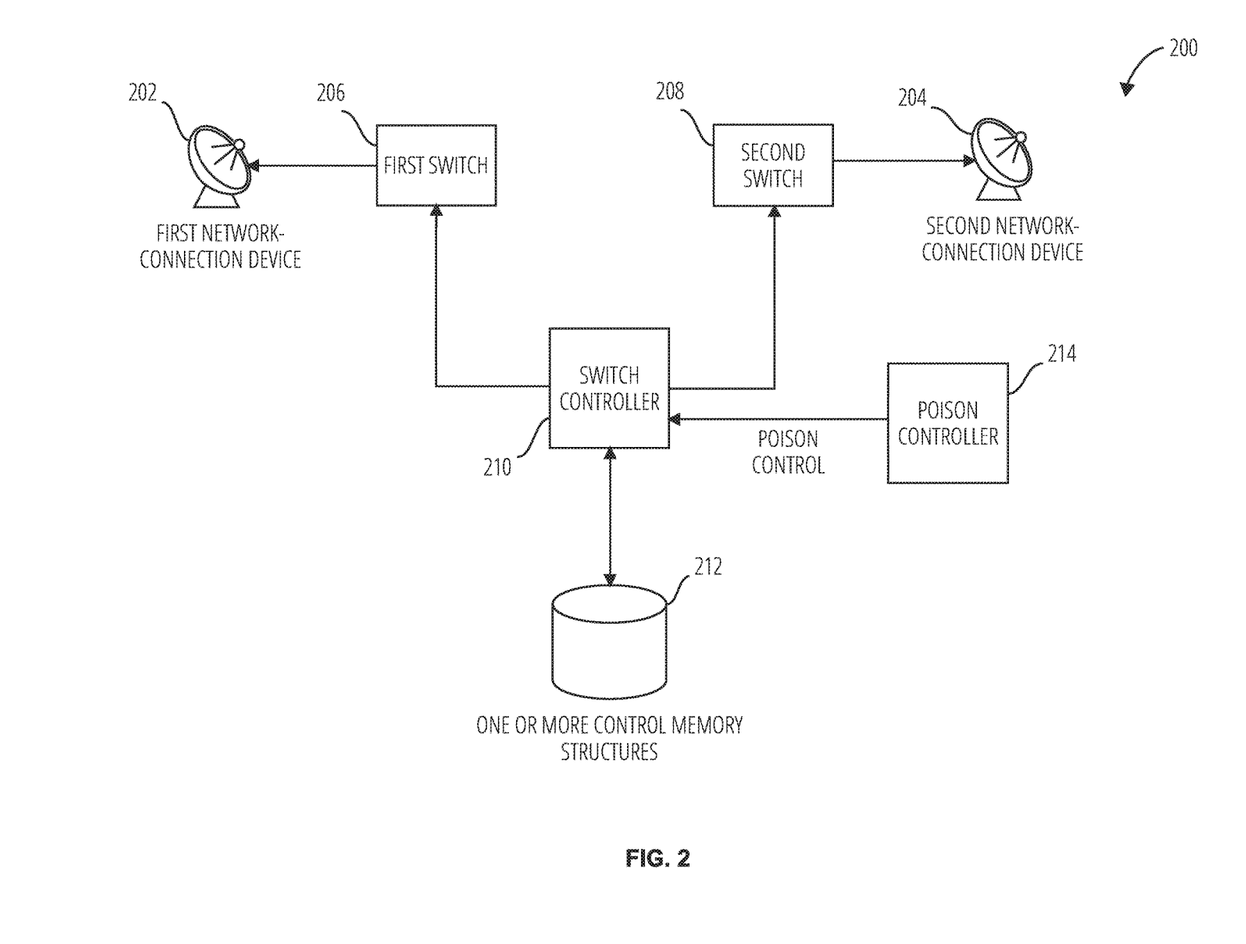
FIG. 2 illustrates an embodiment of an antenna control system 200.

Referring next to FIG. 2, the antenna control system 200 comprises first network-connection device 202, second network-connection device 204, first switch 206, second switch 208, switch controller 210, one or more control memory structures 212, and a poison controller 214.

The first network-connection device 202 and the second network-connection device 204 may send and receive communication with off-board networks. The first network-connection device 202 and the second network-connection device 204 may send and receive from the same network or a different network. The first network-connection device 202 and second network-connection device 204 may communicate with Ku-band and C-band frequencies.

The first switch 206 may send control signals to the first network-connection device 202 with instructions to align with a network, connect or disconnect with a network, and to throttle communication activity with the network.

The second switch 208 may send control signals to the second network-connection device 204 with instructions to align with a network, connect or disconnect with a network, and to throttle communication activity with the network.

The switch controller 210 may send control signals to the first switch 206 and the second switch 208. The control signals comprise instructions for the first switch 206 and the second switch 208 to align the first network-connection device 202 and the second network-connection device 204 with a network, connect or disconnect the first network-connection device 202 and the second network-connection device 204 to a network, to shift some or all communication activity to the first network-connection device 202 or the second network-connection device 204, and to throttle communication activity between the first network-connection device 202 and the second network-connection device 204 and a network. Throttling communication activity may include maintaining communication connections while preventing new communication connections.

The switch controller 210 may receive a poison control from the poison controller 214. The switch controller 210 may cause the switch controller 210 to de-prioritize usage of the first network-connection device 202. The switch controller 210 may de-prioritize the first network-connection device 202 even if the first network-connection device 202 has a well-established connection with a network. The poison controller 214 may instruct the switch controller 210 similarly for the second network-connection device 204.

In one embodiment, the switch controller 210 sends control signals to have new communication traffic communicated via the second network-connection device 204, and the communication activity on the second network-connection device 204 increases. The traffic communicated by the first network-connection device 202 may comprise specific communication items. As those communications end, communication activity decreases on the first network-connection device 202. Eventually, there may be no communication activity on the first network-connection device 202. This end of communications may be detected through the use of a timer of a predetermined duration. If communications are not received within the predetermined duration, then the communications may time out. Thereafter, the switch controller 210 may then send a control signal to the first network-connection device 202 via the first switch 206 to target another network, or remain targeted to the current network.

In other embodiments, current activity on the first network-connection device 202 is discontinued and that activity is communicated by the second network-connection device 204.

In other embodiments, the switch controller 210 maintains current communication activity on the first network-connection device 202. After communication activity on the first network-connection device 202 is below a threshold value (e.g. the signal degrades below a predetermined signal-to-noise ratio), the switch controller 210 may send a control signal to end the communication activity on the first network-connection device 202 and switch that activity to the second network-connection device 204.

In other embodiments, new communication activity may be prioritized to the second network-connection device 204, yet some new communication activity may be sent to the first network-connection device 202. The poison control received by the switch controller 210 may comprise instructions to retrieve information from the one or more control memory structures 212 including location of the vessel, location of blockage zones, geographic footprints of networks, weather patterns, outage zones, vessel orientation, the first network-connection device 202 orientation, the second network-connection device 204 orientation, vessel route, network contract information, and systems of weights, the weights including current time, duration of time since a missed connection, and cost. The retrieved information may be weighted according to the instructions of the poison control to prioritize which network will receive new activity.

The switch controller 210 may send and receive controls with the one or more control memory structures 212. The control signals comprise information regarding location of the vessel, location of blockage zones, geographic footprints of networks, weather patterns, outage zones, vessel orientation, the first network-connection device 202 orientation, the second network-connection device 204 orientation, vessel route, network contract information, and systems of weights, the weights including current time, duration of time since a missed connection, and cost. The control signals received from the one or more control memory structures 212 may affect the control signals sent from the switch controller 210 to the first switch 206 and the second switch 208.

The switch controller 210 may operate in response to historical data stored in one or more control memory structures 212. Specifically, the switch controller 210 may proactively begin operation of the poison controller 214 (discussed below) and alter the connectivity of the first or second network-connection device 202, 204 in response to usage patterns for the associated network-connection devices 202, 204 or other evaluation of overall network traffic made by the switch controller 210 and poison controller 214.

Specifically, the switch controller 210 may move into operation at times or physical locations, on particular routes for one or more craft on which the network-connection devices 202 and 204 are affixed, where usages of the overall system 200 (or particularly communications over the network-connection devices 202 and 204) is low or non-existent. In this way, one or both of the first and second network-connection devices 202, 204 may be transitioned to a new network while usage of one or both devices 202, 204 is least disruptive to the fewest number of users.

For example, as an ocean-going ship traverses on a known course, passengers may sleep at regular or typical times. It may be ascertained that for a particular course, network usage drops dramatically to zero or near zero from 3:45 to 4:00 am (local time). If this is the case, one or both of the first and second network-connection devices 202, 204 may be instructed by the switch controller 210 to transition to a new, available network at that time.

Similarly, as an ocean-going ship enters within approximately 5 miles or port, cellular networks or other land-based networks may become available both to the ship's other communications systems and to individual passengers on the ship. Once the ship has entered this zone or once a ship has docked and been in port for more than a certain number of minutes, it may be determined through historical data that network usage typically drops dramatically. If these lulls are detected, this may be stored in one or more control memory structures 212 and used to initiate control signals to the switch controller 210 to cause the first and/or second network-connection devices 202, 204 to transition to new networks. Transition at these times may result in the least impact upon the overall group of network users, even though transitions between networks are inherently disruptive. Cached network data (e.g. data for frequently-accessed websites and articles) may mask or partially cover transitions.

In general, the switch controller 210 may include logic that either detects or predicts or a combination of both, either when or where usage of the overall network drops or should drop below a predetermined threshold level of use. This threshold may be dynamic and informed, so as to become less-strict, as one or more of the available network quality degrades (for example, as a ship moves further and further over the horizon making an associated satellite less-and-less accessible and increasing interference.

In this way, the transition between networks for one or both of the first and second-connection devices 202, 204 may both determine whether a new network is available for connection, but may also await an appropriate time of limited network utilization. Alternatively, network utilization may prompt a transition to a new network at times or places where network utilization is expected to be less, but when another network's availability might otherwise not prompt a network transition. This may be informed by an expected course following the transition that causes the devices 202, 204 to move into a position that is better-suited for use with a particular network.

The poison controller 214 may send a poison control to the switch controller 210. In some embodiments, the poison controller 214 may receive control signals from the first network-connection device 202 and the second network-connection device 204 to determine when to send a poison control. The poison controller 214 may also query the one or more control memory structures 212 to determine when to send the poison control. Furthermore, the poison controller 214 may receive a manual poison control from a user via a machine interface. The poison controller 214 may also receive control signals from one or more devices receiving controls from the first network-connection device 202, the second network-connection device 204, the first switch 206, the second switch 208, the switch controller 210, the one or more control memory structures 212, and other network-connected devices to determine when to send a poison control. The antenna control system 200 may be operated in accordance with the processes described in FIG. 3.

Figure 3:
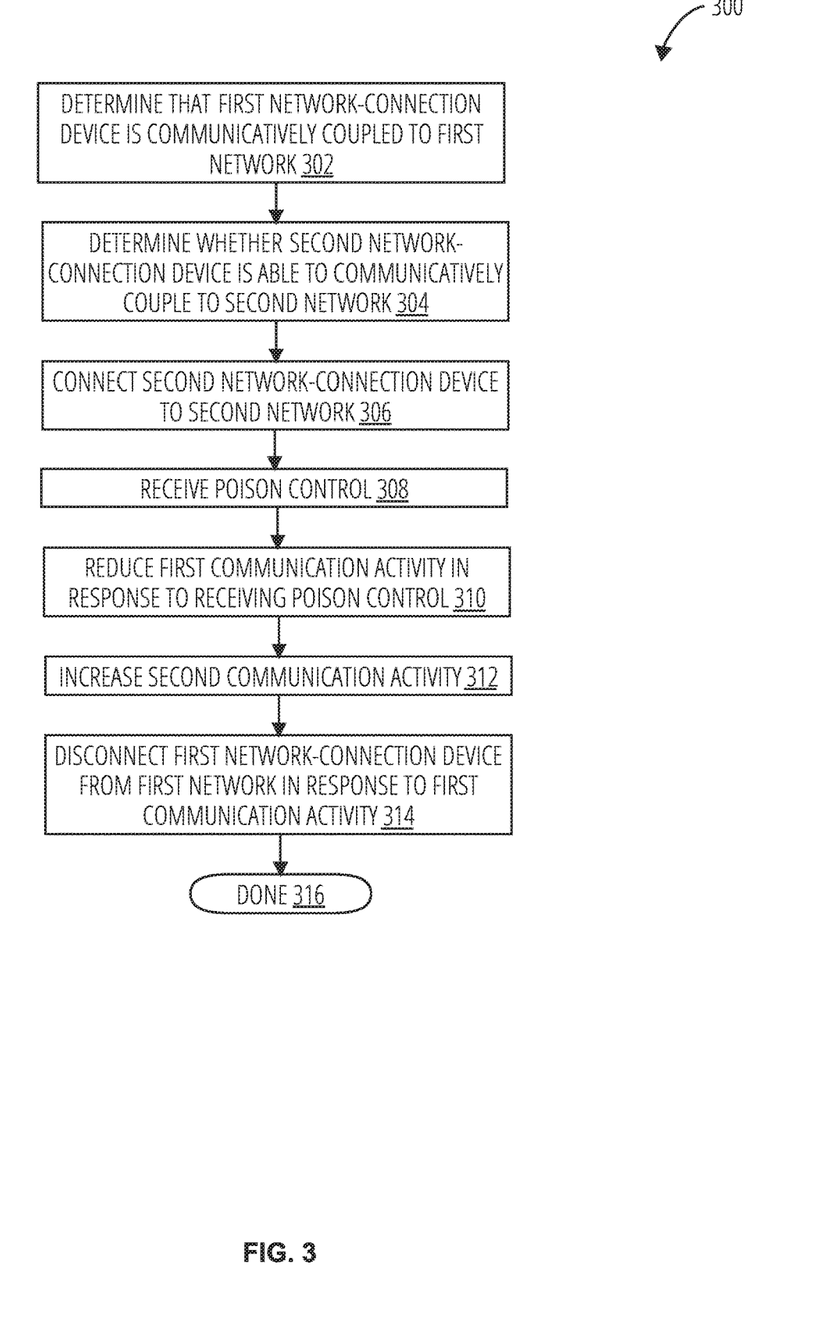
FIG. 3 illustrates an embodiment of a networks-switching process 300.

Referring to FIG. 3, the networks-switching process 300 determines whether a first network-connection device is communicatively coupled to a first network (block 302). The first network-connection device may be located aboard a moving vessel, and the first network may be located off a moving vessel. The first network-connection device has a first communication activity. If the first network-connection device is communicatively coupled to the first network, the networks-switching process 300 determines whether a second network-connection device is able to communicatively couple to a second network (block 304). The second network-connection device may be located aboard the moving vessel, and the second network may be located off a moving vessel. The second network may be selected from one or more available networks. The second network-connection device is communicatively coupled to the second network (block 306). The second network-connection device has a second communication activity. A poison control is received (block 308). The poison control comprises instructions to alter a control system to de-prioritize utilization of the first network-connection device. This is to enable the usage of the first network-connection device to be slowed or eliminated prior to its transition to a new network. As discussed above, the instructions may be based upon the location of the vessel, the availability of a network being used or a new network, utilization of the network resources as a whole, or other characteristics of overall network utilization.

The first communication activity is reduced in response to receiving the poison control (block 310). The second communication activity is increased (block 312). The first network-connection device is de-coupled from the first network in response to the first communication activity (block 314). The networks-switching process 300 ends (done block 316).

In other embodiments, the networks-switching process 300 further de-couples the second network-connection device from the first network prior to communicatively coupling the second network-connection device to the second network.

The networks-switching process 300 may further de-couple the first network-connection device from the first network in response to communicatively coupling the second network-connection device to the second network and communicatively couples the first network-connection device to the second network.

The networks-switching process 300 may further determine that the second network-connection device is able to communicatively couple to the one or more available networks by sending a request control to a network geographic data memory structure and receiving an available network control from the network geographic data memory structure, the available network control comprising a list of the one or more available networks. The list of the one or more available networks may be prioritized based on a historical communicability rating, which may be based on speed of communication activity, likelihood of communication cessation that is not effected by the moving vessel, the location, speed, and direction of the moving vessel, and the like. The historical communicability rating may also be affected by the current and historical operation of one or more moving vessels. The network geographic data memory structure may comprise networks that may be coupled to based on geographic location. The request control may comprise the geographic location of the moving vessel.

The prioritization may be further altered by a user preference control. The user preference control may be weighted with the historical communicability rating to determine the priority of the one or more available one or more available networks. Likewise, the preference control may be weighted so as to prefer (or require) switching networks when overall usage of a network is below a pre-determined threshold or dependent upon the location of an associated vessel.

The networks-switching process 300 may further determine a connection value between the second network-connection device and the second network, receive a connection threshold value control from a connection threshold control memory structure, the connection threshold value control comprising a connection threshold value, and de-couple the second network-connection device from the second network in response to the connection value being less than the connection threshold value. The connection value and the connection threshold value may be or be based on the communication capacity, available bandwidth, dedicated usage limiting overall bandwidth on a particular communications channel, the signal-to-noise ratio for the communication, and other characteristics.

The networks-switching process 300 may further send a route-generating control to a route generator located off the moving vessel. The route-generating control comprises instructions for the route generator to determine a connection route for the second network-connection device utilizing the second network and to send the connection route to the moving vessel. The connection route enables the source, aboard a moving vessel to connect to a destination, such as the internet, a device connected to the internet, a server, a website, a mobile device, and similar devices. The connection route may comprise one or more networking protocols to establish a connection. The connection route is then received from the route generator prior to communicatively coupling the second network-connection device to the second network. Thus, the connection route is generated prior to being utilized. The route generator may determine multiple connection routes, selecting one of the connection routes to send to the moving vessel. The selection may be based on connection rate, reliability of the connection, available bandwidth, sudden or expected unavailability of a network due to interference or downtime, and other selection criteria.

The first communication activity may comprise a first set of communication connections and the second communication activity may comprise a second set of the communication connections. Each of the communication connections may connect a device aboard the moving vessel to a destination, such the internet, a device connected to the internet, a server, a website, a mobile device, and similar devices. The poison control may alter the control system to add new communication connections to the second set of communication connections. Each of the communication connections comprising the first communication activity may end, decreasing the first communication activity. As the second communication activity receives the new communication connections, the second communication activity increases. The first communication activity may eventually comprise no communication connections. In further embodiments, the poison control may disconnect the communication connections comprising the first communication activity after a pre-determined time period (e.g. a timeout). These communication connections may be transferred to the second communication activity by adding those disconnected communication connections as new communication connections, which are then added to the second communication activity per the poison control.

Figure 4:
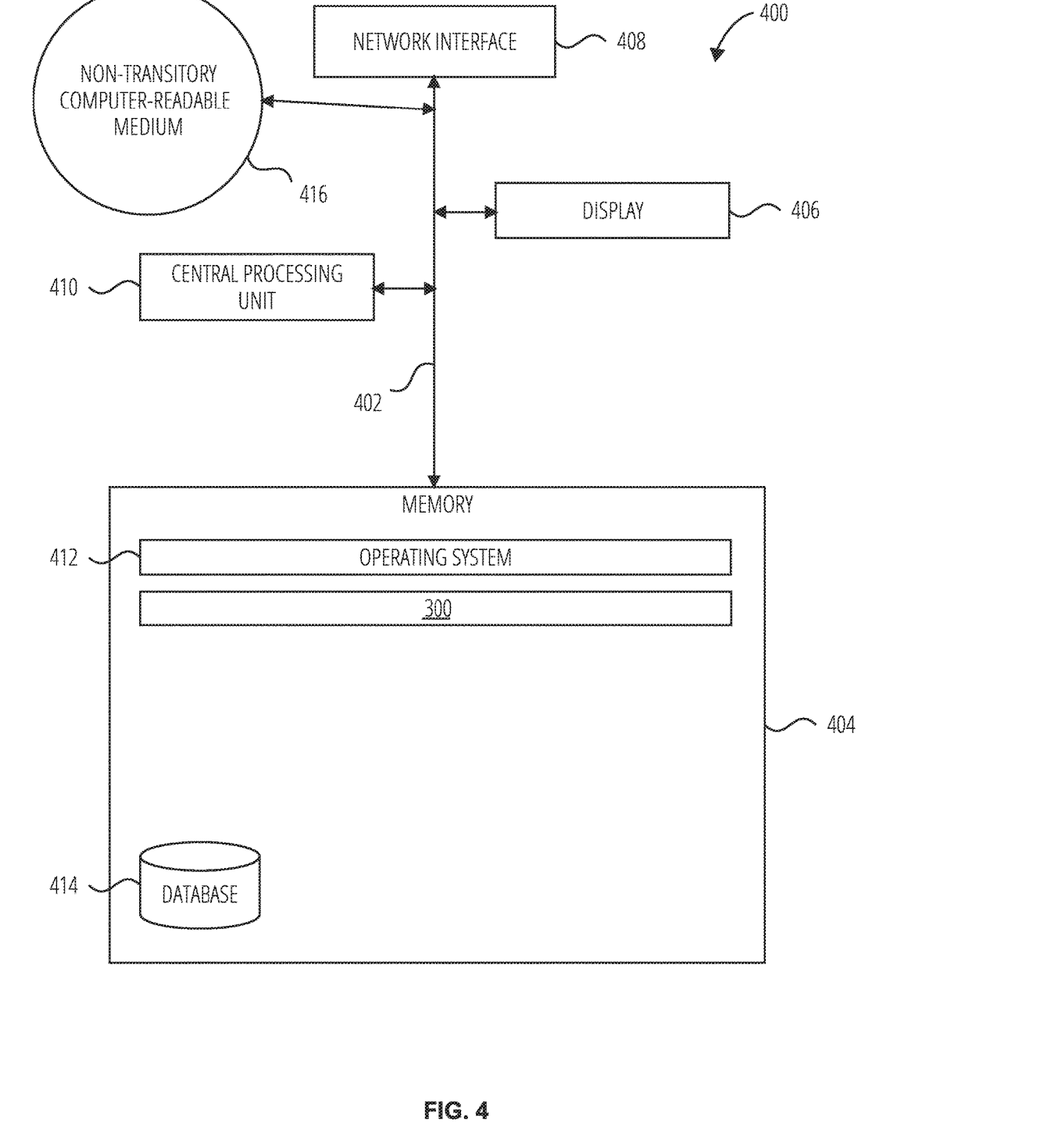
FIG. 4 illustrates a system 400 in accordance with one embodiment.

FIG. 4 illustrates several components of an exemplary system 400 in accordance with one embodiment. In various embodiments, system 400 may include a desktop PC, server, workstation, mobile phone, laptop, tablet, set-top box, appliance, or other computing device that is capable of performing operations such as those described herein. In some embodiments, system 400 may include many more components than those shown in FIG. 4. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 400 may comprise one or more physical and/or logical devices that collectively provide the functionalities described herein. In some embodiments, system 400 may comprise one or more replicated and/or distributed physical or logical devices.

In some embodiments, system 400 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 400 includes a bus 402 interconnecting several components including a network interface 408, a display 406, a central processing unit 410, and a memory 404.

Memory 404 generally comprises a random access memory ("RAM") and permanent non-transitory mass storage device, such as a hard disk drive or solid-state drive. Memory 404 stores an operating system 412.

These and other software components may be loaded into memory 404 of system 400 using a drive mechanism (not shown) associated with a non-transitory computer-readable medium 416, such as a DVD/CD-ROM drive, memory card, network download, or the like.

Memory 404 also includes database 414. In some embodiments, system 400 may communicate with database 414 via network interface 408, a storage area network ("SAN"), a high-speed serial bus, and/or via the other suitable communication technology.

In some embodiments, database 414 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"Associator" in this context refers to a correlator (see the definition for Correlator).

"Connection threshold value" in this context refers to a value of similar units to the connection value utilized to determine whether a device continues to connect to a network.

"Connection value" in this context refers to a measurement of the ability of two devices to connect and may be measure in multiple ways, including upload speed, download speed, maximum information volume capacity, signal-to-noise ratio, etc.

"Control system" in this context refers to a system that manages, commands, directs or regulates the behavior of other devices or systems.

"Correlator" in this context refers to a logic element that identifies a configured association between its inputs. One examples of a correlator is a lookup table (LUT) configured in software or firmware. Correlators may be implemented as relational databases. An example LUT correlator is: |low_alarm_condition|low_threshold_value| 0| |safe_condition-|safe_lower_bound|safe_upper_bound| |high_alarm_condition|high_threshold_value| 0|. Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"First communication activity" in this context refers to the measurement of the communication of a first device to a network that may be measure in multiple ways, including upload speed, download speed, total information volume, information volume rate, number of processes utilizing the communication pathway, etc.

"Networking protocol" in this context refers to formal standards and policies comprised of rules, procedures and formats that define communication between two or more devices over a network.

"Networks" in this context refers to a number of interconnected computers, machines, or operations.

"Second communication activity" in this context refers to the measurement of the communication of a second device to a network that may be measure in multiple ways, including upload speed, download speed, total information volume, information volume rate, number of processes utilizing the communication pathway, etc.

"Selector" in this context refers to a logic element that selects one of two or more inputs to its output as determined by one or more selection controls. Examples of hardware selectors are multiplexers and demultiplexers. An example software or firmware selector is: if (selection_control==true) output=input1; else output=input2; Many other examples of selectors will be evident to those of skill in the art, without undo experimentation.

"Signal-to-noise ratio" in this context refers to the ratio of the strength of an electrical or other signal carrying information to that of interference, generally expressed in decibels.

"Switch" in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; A somewhat more complicated software/firmware switch is: if (selection1==true and selection2==true) output=input1; else if (selection)==true and selection2==false) output=input2; else if (selection1==false and selection2==true) output=input3; else output=noOp; Switches operate similarly to selectors in many ways (see the definition of Selector), except in some cases switches may select all inputs to the output, (s) not select among inputs. Other examples of switches will be readily apparent to those having skill in the art, without undo experimentation.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A computing apparatus for switching networks aboard a moving vessel, the computing apparatus comprising:
   a processor; and
   a memory storing instructions that, when executed by the processor, configure the apparatus to:
   determine that a first network-connection device located aboard the moving vessel is communicatively coupled to a first network located off the moving vessel, the first network-connection device having a first communication activity;
   determine that a second network-connection device aboard the moving vessel is able to communicatively couple to a second network, the second network selected from one or more available networks located off the moving vessel;
   communicatively couple the second network-connection device to the second network, the second network-connection device having a second communication activity;
   receive a poison control, the poison control comprising second instructions to alter a control system to de-prioritize utilization of the first network-connection device;
   reduce the first communication activity in response to receiving the poison control;
   increase the second communication activity;
   disconnect the first network-connection device from the first network in response to the first communication activity being below a threshold activity;
   determine a connection value between the second network-connection device and the second network;
   receive a connection threshold value control from a connection threshold control memory structure, the connection threshold value control comprising a connection threshold value; and
   disconnect the second network-connection device from the second network in response to the connection value being less than the connection threshold value.

2. The computing apparatus of claim 1, wherein the instructions further configure the apparatus to:
   disconnect the second network-connection device from the first network prior to connecting the second network-connection device to the second network.

3. The computing apparatus of claim 1, wherein the instructions further configure the apparatus to:

disconnect the first network-connection device from the first network in response to connecting the second network-connection device to the second network; and
connect the first network-connection device to the second network.

4. The computing apparatus of claim 1, wherein determining that the second network-connection device is able to communicatively couple to the one or more available networks comprises:
send a request control to a network geographic data memory structure; and
receive an available network control from the network geographic data memory structure in response to the request control, the available network control comprising a list of the one or more available networks.

5. The computing apparatus of claim 4, wherein the list of the one or more available networks is prioritized based on a historical network connectivity, the one of the one or more available networks having a highest priority being communicatively coupled to the second network-connection device as the second network.

6. The computing apparatus of claim 4, wherein the list of the one or more available networks is prioritized based on a user preference control, the one of the one or more available networks having a highest priority being communicatively coupled to the second network-connection device as the second network.

7. The computing apparatus of claim 1, wherein the connection value is based on a signal-to-noise ratio between the second network-connection device and the second network.

8. The computing apparatus of claim 1, wherein the instructions further configure the apparatus to:
send a route-generating control to a route generator located off the moving vessel, the route-generating control comprising third instructions for the route generator to:
determine a connection route for the second network-connection device utilizing the second network; and
send the connection route to the moving vessel; and
receive the connection route from the route generator prior to communicatively coupling the second network-connection device to the second network.

9. The computing apparatus of claim 1, wherein:
the first communication activity comprises a first set of communication connections;
the second communication activity comprises a second set of the communication connections; and
the poison control alters the control system to add new communication connections to the second set of the communication connections.

10. The computing apparatus of claim 9, wherein the second instructions of the poison control operate the control system to transfer the communication connections associated with the first set of the communication connections to the second set of the communication connections after a pre-determined time period.

11. A method for switching networks aboard a moving vessel comprising:
determining that a first network-connection device located aboard the moving vessel is communicatively coupled to a first network located off the moving vessel, the first network-connection device having a first communication activity;
determining that a second network-connection device aboard the moving vessel is able to communicatively couple to a second network, the second network selected from one or more available networks located off the moving vessel;
communicatively coupling the second network-connection device to the second network, the second network-connection device having a second communication activity;
receiving a poison control, the poison control comprising instructions to alter a control system to de-prioritize utilization of the first network-connection device;
reducing the first communication activity in response to receiving the poison control;
increasing the second communication activity;
disconnecting the first network-connection device from the first network in response to the first communication activity being below a threshold activity;
determining a connection value between the second network-connection device and the second network;
receiving a connection threshold value control from a connection threshold control memory structure, the connection threshold value control comprising a connection threshold value; and
disconnecting the second network-connection device from the second network in response to the connection value being less than the connection threshold value.

12. The method of claim 11, further comprising:
disconnecting the second network-connection device from the first network prior to connecting the second network-connection device to the second network.

13. The method of claim 11, further comprising:
disconnecting the first network-connection device from the first network in response to connecting the second network-connection device to the second network; and
connecting the first network-connection device to the second network.

14. The method of claim 11, wherein determining that the second network-connection device is able to be communicatively coupled to the one or more available networks comprises:
sending a request control to a network geographic data memory structure; and
receiving an available network control from the network geographic data memory structure in response to the request control, the available network control comprising a list of the one or more available networks.

15. The method of claim 14, wherein the list of the one or more available networks is prioritized based on a historical network connectivity, the one of the one or more available networks having a highest priority being communicatively coupled to the second network-connection device as the second network.

16. The method of claim 14, wherein the list of the one or more available networks is prioritized based on a user preference control, the one of the one or more available networks having a highest priority being communicatively coupled to the second network-connection device as the second network.

17. The method of claim 11, wherein the connection value is based on a signal-to-noise ratio between the second network-connection device and the second network.

18. The method of claim 11, further comprising:
sending a route-generating control to a route generator located off the moving vessel, the route-generating control comprising second instructions for the route generator to:
determine a connection route for the second network-connection device utilizing the second network; and send the connection route to the moving vessel; and receiving the connection route from the route generator prior to communicatively coupling the second network-connection device to the second network.

19. The method of claim 11, wherein:

the first communication activity comprises a first set of communication connections;

the second communication activity comprises a second set of the communication connections; and the poison control alters the control system to add new communication connections to the second set of the communication connections.

20. The method of claim 19, wherein the instructions of the poison control operate the control system to transfer the communication connections associated with the first set of the communication connections to the second set of the communication connections after a pre-determined time period.

21. A computing apparatus for switching networks aboard a moving vessel, the computing apparatus comprising:

a processor; and a memory storing instructions that, when executed by the processor, configure the apparatus to:

determine that a first network-connection device located aboard the moving vessel is communicatively coupled to a first network located off the moving vessel, the first network-connection device having a first communication activity;

determine that a second network-connection device aboard the moving vessel is able to communicatively couple to a second network, the second network selected from one or more available networks located off the moving vessel;

communicatively couple the second network-connection device to the second network, the second network-connection device having a second communication activity;

receive a poison control, the poison control comprising second instructions to alter a control system to de-prioritize utilization of the first network-connection device;

reduce the first communication activity in response to receiving the poison control;

increase the second communication activity;

determine a connection value of the first communication activity between the first network-connection device and the first network;

receive a connection threshold value control from a connection threshold control memory structure, the connection threshold value control comprising a connection threshold value; and disconnect the first network-connection device from the first network in response to the connection value being less than the connection threshold value.

* * * * *